US012056082B2

(12) United States Patent
Tanaka et al.

(10) Patent No.: US 12,056,082 B2
(45) Date of Patent: Aug. 6, 2024

(54) DISTRIBUTED PROCESSING SYSTEM AND METHOD

(71) Applicant: Nippon Telegraph and Telephone Corporation, Tokyo (JP)

(72) Inventors: Kenji Tanaka, Tokyo (JP); Tsuyoshi Ito, Tokyo (JP); Yuki Arikawa, Tokyo (JP); Tsutomu Takeya, Tokyo (JP); Kazuhiko Terada, Tokyo (JP); Takeshi Sakamoto, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 18/251,123

(22) PCT Filed: Nov. 11, 2020

(86) PCT No.: PCT/JP2020/042031
§ 371 (c)(1),
(2) Date: Apr. 28, 2023

(87) PCT Pub. No.: WO2022/102009
PCT Pub. Date: May 19, 2022

(65) Prior Publication Data
US 2024/0004828 A1 Jan. 4, 2024

(51) Int. Cl.
*G06F 15/16* (2006.01)
*G06F 9/38* (2018.01)
*G06F 15/173* (2006.01)

(52) U.S. Cl.
CPC ...... *G06F 15/17306* (2013.01); *G06F 9/3867* (2013.01)

(58) Field of Classification Search
CPC ................ G06F 15/17306; G06F 9/3867
USPC ........................................... 709/218
See application file for complete search history.

(56) References Cited

U.S. PATENT DOCUMENTS

| | | | | |
|---|---|---|---|---|
| 2019/0312772 | A1* | 10/2019 | Zhao | G06F 9/5011 |
| 2021/0034922 | A1* | 2/2021 | Chenxi | G06F 16/288 |
| 2021/0194831 | A1* | 6/2021 | Huang | G06N 3/08 |
| 2021/0209443 | A1* | 7/2021 | Kawai | G06N 3/08 |
| 2022/0121465 | A1* | 4/2022 | Lan | G06F 9/5066 |
| 2022/0398431 | A1* | 12/2022 | Tanaka | G06N 3/04 |

(Continued)

OTHER PUBLICATIONS

Takumi et al. "Using ResNet-50/ImageNet Learning Video in Large GPU Clusters", Research Report by Information Processing, Society of Japan, IPSJ SIG Technical Report, vol. 2019, No. 6, pp. 1-7.

(Continued)

*Primary Examiner* — Alan S Chou
(74) *Attorney, Agent, or Firm* — Slater Matsil, LLP

(57) ABSTRACT

Each NIC performs an aggregation calculation of data output from each processor in a normal order including a head NIC located at a head position of a first pipeline connection, an intermediate NIC located at an intermediate position, and a tail NIC located at a tail position, and when the aggregation calculation in the tail NIC is completed, each NIC starts distribution of an obtained aggregation result, distributes the aggregation result in a reverse order including the tail NIC, the intermediate NIC, and the head NIC, and outputs the aggregation result to the processor of the communication interface.

3 Claims, 9 Drawing Sheets

(56) References Cited

U.S. PATENT DOCUMENTS

2023/0004787 A1* 1/2023 Tanaka ................. G06N 3/08
2023/0333898 A1* 10/2023 Zhao ................. G06F 9/5044

OTHER PUBLICATIONS

Tanaka et al. "Communication-Efficient Distributed Deep Learning with GPU-FPGA Heterogeneous Computing," 2020 IEEE Symposium on High-Performance Interconnects (HOTI2020), Aug. 19, 2020, 4 pages. As discussed in the specification.

Tanaka et al., "Distributed deep learning acceleration with FPGA Ring-Allreduce", Information Processing Society of Japan 82nd National Convention, Mar. 5, 2020, pp. 1-31-1-32.

* cited by examiner

DISTRIBUTED PROCESSING SYSTEM AND METHOD

CROSS-REFERENCE TO RELATED APPLICATIONS

This application is a national phase entry of PCT Application No. PCT/JP2020/042031, filed on Nov. 11, 2020, which application is hereby incorporated herein by reference.

TECHNICAL FIELD

The present invention relates to an interconnect technology of a distributed processing system used in data parallel type distributed deep learning.

BACKGROUND

A deep neural network (hereinafter referred to as DNN) is attracting increasing attention from both sides of industry and academia, and have shown remarkable performance improvement by specializing in various domains, for example, image recognition, speech recognition, natural language processing, and the like. Further, it is also utilized as an imitation or simulation of a complicated and large-scale physical phenomenon, and greatly contributes to the scientific field.

However, as the magnitude of the problem to be solved becomes larger and more complicated, or as the accuracy of prediction and classification is to be improved, the amount of data and the amount of calculation required for learning of DNN increases, and a high-performance computing system is required.

In the distributed deep learning, a plurality of processors is connected by a network in order to meet a required enormous amount of calculation, and learning is performed by sharing data and a DNN model for each processor. However, similarly to general parallel computing, it is known that communication between processors becomes a bottleneck, and scalability of the system is limited. In particular, in data parallel type distributed deep learning, it is known that collective communication called Allreduce (collective communication algorithm) that shares and merges gradient information calculated by each processor becomes a large bottleneck.

Therefore, multiple studies for improving scalability by optimizing an update rule and a communication algorithm have been reported so far. In order to fundamentally alleviate this bottleneck, an interconnect of heterogeneous computing including a central processing unit (CPU) used to process the distributed deep learning and a plurality of graphics processing units (GPUs) has attracted attention.

In recent years, in order to achieve high performance, GPUDirect RDMA or RDMA over Converged Ethernet (RoCE) that stores data directly from a network to a device memory of a GPU by bypassing a CPU has been employed in the interconnect of heterogeneous computing. Such a configuration is known to be capable of moving data with an extremely low delay, but in a case of data movement in cooperation with some processing, there has been a problem that a delay necessary for the processing mainly occurs.

Torsten et al. point out that the L2 cache latency of RDMA to the CPU memory is slower than the latency of Ethernet (registered trademark) of 100 Gbps or higher. Similarly, according to research by Zhe et al., GPUL2 cache latency (for example, L2 cache latency for V100 is 193 cycles and cache latency for P100 is 234 cycles) is also about 20 times slower compared to the throughput of 100 Gbps Ethernet. That is, it is considered that not the delay of data movement itself but a communication overhead when the data movement and the processing cooperate with each other lowers the performance of Allreduce.

In the distributed deep learning, for example, after gradients of loss functions in parameters of a model are obtained with different data, an average of the gradients is obtained between processors, and the obtained average is regarded as an obtained gradient and applied to the model. As the processing of obtaining the average of the gradients, processing of aggregating (reducing) array data included in each processor using convolution calculation processing or the like and equally distributing an aggregation result to all the processors, that is, Allreduce is required.

In Allreduce, a distributed processing algorithm such as a Ring-Allreduce algorithm that employs a ring-type topology in which processors are connected in a ring shape via a communication ring is used in order to distribute processing so as not to cause an imbalance in processing amounts between the processors. Conventionally, in order to speed up distributed processing using such a Ring-Allreduce algorithm, the inventors have proposed an interconnect technology of an NIC offloading system (see, for example, Non Patent Literature 1).

In this interconnect technology, aggregation calculation processing and data distribution processing in the Ring-Allreduce algorithm are configured to be offloaded to a communication interface network interface card (NIC) of each processor. Thus, the aggregation calculation processing and the data distribution processing can be pipelined, and processing delays caused by the communication overhead can be greatly reduced.

CITATION LIST

Non Patent Literature

Non Patent Literature 1: Kenji Tanaka, Yuki Arikawa, Ito Tsuyoshi, Kazutaka Morita, Naru Nemoto, Fumiaki Miura, Kazuhiko Terada, Junji Teramoto and Takeshi Sakamoto, "Communication-Efficient Distributed Deep Learning with GPU-FPGA Heterogeneous Computing", 2020 IEEE Symposium on High-Performance Interconnects (HOTI 2020), 19-21 Aug. 2020

SUMMARY

Technical Problem

According to the conventional technology (Non Patent Literature 1) described above, when the aggregation result is distributed to each processor, among the processors involved in the aggregation calculation processing of the aggregation result, the aggregation result is transferred once from a tail NIC of a tail processor located at a tail position in a processing order to a head NIC of a processor located at a head position in the processing order, and the distribution of the aggregation result is started from the head NIC to each NIC according to a processing completion determination in the head NIC. Thus, data transfer not directly related to the aggregation calculation processing and the distribution processing occurs, and there has been a problem that an unnecessary processing delay occurs due to this.

Embodiments of the present invention are intended to solve such a problem, and an object thereof is to provide an interconnect technology capable of further improving delay performance of Allreduce in an interconnect of heterogeneous computing.

Solution to Problem

In order to achieve such an object, a distributed processing system according to the embodiments of the present invention is a distributed processing system including a plurality of processors that performs calculation processing, and a plurality of communication interfaces that is provided respectively corresponding to the plurality of processors and configures a first pipeline connection by connecting the plurality of processors via a first communication line, the plurality of communication interfaces performing aggregation calculation processing of array data held in a distributed manner by the plurality of processors on the basis of a Ring-Allreduce algorithm, and distributing an obtained aggregation result to each of the processors, in which each of the plurality of communication interfaces performs an aggregation calculation of data belonging to the array data output from the each processor in a normal order including a head communication interface located at a head position of the first pipeline connection, an intermediate communication interface located at an intermediate position, and a tail communication interface located at a tail position, and each of the plurality of communication interfaces starts distribution of an obtained aggregation result in a case where the aggregation calculation in the tail communication interface is completed, distributes the aggregation result in a reverse order including the tail communication interface, the intermediate communication interface, and the head communication interface, and outputs the aggregation result to the processor of the communication interface.

Further, another distributed processing system according to embodiments of the present invention is a distributed processing system including a plurality of processors that performs calculation processing, and a plurality of communication interfaces that is provided respectively corresponding to the plurality of processors and configures a first pipeline connection by connecting the plurality of processors via a first communication line, the plurality of communication interfaces performing aggregation calculation processing of first array data held in a distributed manner by the plurality of processors on the basis of a Ring-Allreduce algorithm, and distributing an obtained aggregation result to each of the processors, in which the distributed processing system includes a plurality of blocks including the plurality of processors and the plurality of communication interfaces, the communication interface belonging to each of the blocks generates an aggregation result by performing an aggregation calculation of data belonging to the first array data output from the each processor in a normal order including a head communication interface located at a head position of the first pipeline connection of the block, an intermediate communication interface located at an intermediate position, and a tail communication interface located at a tail position, the tail communication interface belonging to each of the blocks configures a second pipeline connection by connecting the blocks via a second communication line, further performs an aggregation calculation of the aggregation result obtained in each of the blocks by the second pipeline connection, and distributes an obtained aggregation result among the blocks to each other by the second pipeline connection, and when the aggregation result among the blocks is obtained by the second pipeline connection, the communication interface belonging to each of the blocks starts distribution of the aggregation result among the blocks, distributes the aggregation result among the blocks in a reverse order including the tail communication interface, the intermediate communication interface, and the head communication interface, and outputs the aggregation result among the blocks to the processor of the communication interface.

Further, a distributed processing system includes a plurality of processors that performs calculation processing, and a plurality of communication interfaces that is provided respectively corresponding to the plurality of processors and configures a first pipeline connection by connecting the plurality of processors via a first communication line, the plurality of communication interfaces performing aggregation calculation processing of first and second array data held in a distributed manner by the plurality of processors on the basis of a Ring-Allreduce algorithm, and distributing an obtained aggregation result to each of the processors, in which the distributed processing system includes a plurality of blocks including the plurality of processors and the plurality of communication interfaces, the communication interface belonging to each of the blocks generates a first aggregation result by performing an aggregation calculation of data belonging to the first array data output from the each processor in a normal order including a head communication interface located at a head position of the first pipeline connection of the block, an intermediate communication interface located at an intermediate position, and a tail communication interface located at a tail position, the communication interface belonging to each of the blocks generates a second aggregation result by performing an aggregation calculation of data belonging to the second array data output from the each processor in a reverse order including the tail communication interface, the intermediate communication interface, and the head communication interface, the tail communication interface belonging to each of the blocks configures a second pipeline connection by connecting the blocks via a second communication line, further performs an aggregation calculation of the first aggregation result obtained in each of the blocks by the second pipeline connection, and distributes an obtained aggregation result among first blocks to each other by the second pipeline connection, the head communication interface belonging to each of the blocks configures a third pipeline connection by connecting the blocks via a third communication line, further performs an aggregation calculation of the second aggregation result obtained in each of the blocks by the third pipeline connection, and distributes an obtained aggregation result among second blocks to each other by the third pipeline connection, and the communication interface belonging to each of the blocks distributes the aggregation result among the first blocks obtained by the second pipeline connection in a reverse order of the tail communication interface, the intermediate communication interface, and the head communication interface, distributes the aggregation result among the second blocks obtained by the third pipeline connection in a normal order of the head communication interface, the intermediate communication interface, and the tail communication interface, and outputs the aggregation results among the first and second blocks to the processor of the communication interface.

Further, a distributed processing method according to embodiments of the present invention is a distributed processing method used in a distributed processing system including a plurality of processors that performs calculation processing, and a plurality of communication interfaces that is provided respectively corresponding to the plurality of processors and configures a first pipeline connection by connecting the plurality of processors via a first communication line, the plurality of communication interfaces performing an aggregation calculation of array data held in a distributed manner by the plurality of processors on the basis of a Ring-Allreduce algorithm, and distributing an obtained aggregation result to each of the processors, the distributed processing method including a first step in which each of the plurality of communication interfaces performs an aggregation calculation of data belonging to the array data output from the each processor in a normal order including a head communication interface located at a head position of the first pipeline connection, an intermediate communication interface located at an intermediate position, and a tail communication interface located at a tail position, and a second step in which each of the plurality of communication interfaces starts distribution of an obtained aggregation result in a case where the aggregation calculation in the tail communication interface is completed, distributes the aggregation result in a reverse order including the tail communication interface, the intermediate communication interface, and the head communication interface, and outputs the aggregation result to the processor of the communication interface.

Further, another distributed processing method according to embodiments of the present invention is a distributed processing method used in a distributed processing system including a plurality of processors that performs calculation processing, and a plurality of communication interfaces that is provided respectively corresponding to the plurality of processors and configures a first pipeline connection by connecting the plurality of processors via a first communication line, the plurality of communication interfaces performing an aggregation calculation of first array data held in a distributed manner by the plurality of processors on the basis of a Ring-Allreduce algorithm, and distributing an obtained aggregation result to each of the processors, the distributed processing method including a first step in which the communication interface belonging to each of blocks generates an aggregation result by performing an aggregation calculation of data belonging to the first array data output from the each processor in a normal order including a head communication interface located at a head position of the first pipeline connection of the block, an intermediate communication interface located at an intermediate position, and a tail communication interface located at a tail position, a second step in which the tail communication interface belonging to each of the blocks configures a second pipeline connection by connecting the blocks via a second communication line, further performs an aggregation calculation of the aggregation result obtained in each of the blocks by the second pipeline connection, and distributes an obtained aggregation result among the blocks to each other by the second pipeline connection, and a third step in which, when the aggregation result among the blocks is obtained by the second pipeline connection, the tail communication interface belonging to each of the blocks starts distribution of the aggregation result among the blocks, distributes the aggregation result among the blocks in a reverse order including the tail communication interface, the intermediate communication interface, and the head communication interface, and outputs the aggregation result among the blocks to the processor of the communication interface.

Further, another distributed processing method according to embodiments of the present invention is a distributed processing system including a plurality of blocks each including a plurality of processors that performs calculation processing, and a plurality of communication interfaces that is provided respectively corresponding to the plurality of processors and configures a first pipeline connection by connecting the plurality of processors via a first communication line, the plurality of communication interfaces performing an aggregation calculation of first and second array data held in a distributed manner by the plurality of processors on the basis of a Ring-Allreduce algorithm, and distributing an obtained aggregation result to each of the processors, the distributed processing method including a first step in which the communication interface belonging to each of the blocks generates a first aggregation result by performing an aggregation calculation of data belonging to the first array data output from the each processor in a normal order including a head communication interface located at a head position of the first pipeline connection of the block, an intermediate communication interface located at an intermediate position, and a tail communication interface located at a tail position, a second step in which the communication interface belonging to each of the blocks generates a second aggregation result by performing an aggregation calculation of data belonging to the second array data output from the each processor in a reverse order including the tail communication interface, the intermediate communication interface, and the head communication interface, a third step in which the tail communication interface belonging to each of the blocks configures a second pipeline connection by connecting the blocks via a second communication line, further performs an aggregation calculation of the first aggregation result obtained in each of the blocks by the second pipeline connection, and distributes an obtained aggregation result among first blocks to each other by the second pipeline connection, a fourth step in which the head communication interface belonging to each of the blocks configures a third pipeline connection by connecting the blocks via a third communication line, further performs an aggregation calculation of the second aggregation result obtained in each of the blocks by the third pipeline connection, and distributes an obtained aggregation result among second blocks to each other by the third pipeline connection, a fifth step in which the communication interface belonging to each of the blocks distributes the aggregation result among the first blocks obtained by the second pipeline connection in a reverse order of the tail communication interface, the intermediate communication interface, and the head communication interface, and outputs the aggregation result among the first blocks to the processor of the communication interface, and a sixth step in which the communication interface belonging to each of the blocks distributes the aggregation result among the second blocks obtained by the third pipeline connection in a normal order of the head communication interface, the intermediate communication interface, and the tail communication interface, and outputs the aggregation results among the second blocks to the processor of the communication interface.

Advantageous Effects of Embodiments of Invention

According to embodiments of the present invention, it is possible to further improve delay performance of Allreduce in an interconnect of heterogeneous computing.

DETAILED DESCRIPTION OF ILLUSTRATIVE EMBODIMENTS

Hereinafter, embodiments of the present invention will be described with reference to the drawings.

[First Embodiment]

Figure 1:
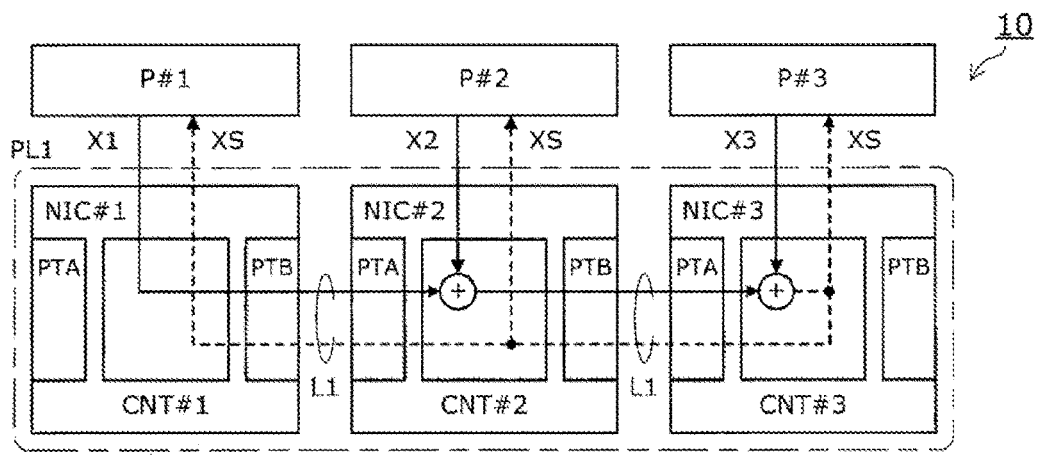
FIG. 1 is a block diagram illustrating a configuration and an operation of a distributed processing system according to a first embodiment.

First, a distributed processing system 10 according to a first embodiment of the present invention will be described with reference to FIG. 1. FIG. 1 is a block diagram illustrating a configuration and an operation of the distributed processing system according to the first embodiment.

The distributed processing system 10 is a heterogeneous computing system including a central processing unit (CPU) and a plurality of graphics processing units (GPUs) used for data parallel type distributed deep learning and used for processing distributed deep learning.

[Principle of Embodiments of Present Invention]

In the distributed deep learning, for example, after gradients of loss functions in parameters of a model are obtained with different data, an average of the gradients is obtained between processors, and the obtained average is regarded as an obtained gradient and applied to the model. As the processing of obtaining the average of the gradients, processing of aggregating (reducing) array data included in each processor using convolution calculation processing or the like and equally distributing an aggregation result to all the processors, that is, Allreduce is required.

In Allreduce, a distributed processing algorithm such as a Ring-Allreduce algorithm employing a ring-type topology in which processors are connected in a ring shape via a communication ring is used in order to distribute processing so as not to cause an imbalance in processing amounts between the processors. Conventionally, in order to speed up distributed processing using such a Ring-Allreduce algorithm, the inventors have proposed the interconnect technology of the NIC offloading system described above (see, for example, Non Patent Literature 1). First, this conventional technology will be described.

For example, in the Ring-Allreduce algorithm, it is assumed that M (M is an integer of 2 or more) processors respectively hold M pieces of individual data, and each processor selects its own data one by one and sequentially adding (reducing) the data to data received from the pre-stage processor, and performs processing of transmitting an obtained addition result to the subsequent-stage processor. Thus, each processor adds its own data one by one to the addition result circulating on the communication ring, and each processor obtains one each of M types of addition results at a time point when the addition result have gone around all the processors along the communication ring.

When these addition results are further cycled through the communication ring, all the processors eventually share all the M types of addition results. Thus, for example, as compared with a case where all addition processes are executed by one processor, it can be seen that the calculation processing amount of each processor and the amount of data transmitted and received between the processors are efficiently distributed to each processor.

In the conventional technology described above, aggregation calculation processing and data distribution processing in the Ring-Allreduce algorithm are configured to be offloaded to a network interface card (NIC) of each processor. Thus, the aggregation calculation processing and the data distribution processing can be pipelined, and processing delays caused by the communication overhead can be greatly reduced.

Figure 2:
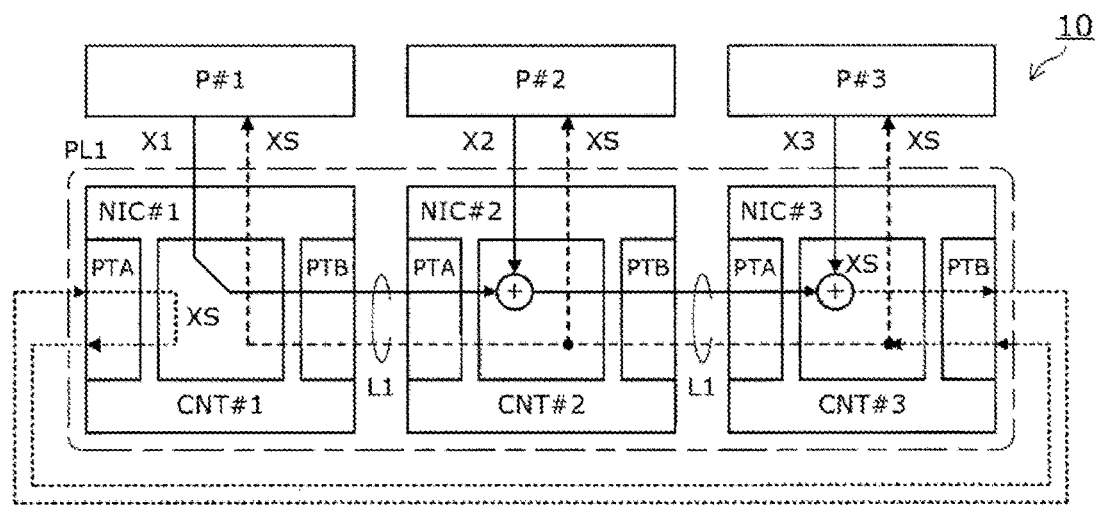
FIG. 2 is a block diagram illustrating a configuration and an operation of a conventional distributed processing system (NIC offloading method).

FIG. 2 is a block diagram illustrating a configuration and an operation of a conventional distributed processing system (NIC offloading method). Here, as an example of the distributed processing system 50, an example is illustrated in which three processors P #1, P #2, and P #3 are connected by communication interfaces NIC #1, #2, and #3 corresponding thereto to form a first pipeline connection PL1. Hereinafter, the communication interface NIC is simply referred to as an NIC.

In FIG. 2, data X1 output from the processor P #1 is transmitted from the NIC #1 to the next NIC #2. The data X1 is received by the NIC #2 and added to data X2 output from the processor P #2, and an obtained intermediate result (X1+X2) is transmitted from the NIC #2 to the next NIC #3. The intermediate result is received by the NIC #3 and added to data X3 output from the processor P #3, and an obtained addition result XS (=X1+X2+X3), that is, an aggregation result is transferred from the NIC #3 to the original NIC #1.

An addition result XS of the data X1, X2, and X3 obtained in this manner is received by the NIC #1 of the processor P #1. Here, since the addition result XS has circulated up to the head NIC #1 of the processor P #1 located at the head position in the processing order among the processors P #1, #2, and #3 involved in the aggregation calculation processing of the addition result XS, the NIC #1 determines that aggregation processing has been completed and starts the distribution processing of the received addition result XS.

In this distribution processing, first, the addition result XS is returned from the NIC #1 to the NIC #3. Thus, the addition result XS is received by the NIC #3, output to the processor P #3, and distributed to the NIC #2. Similarly, the addition result XS is received by the NIC #2, output to the processor P #2, and distributed to the NIC #1. Finally, the addition result XS is received by the NIC #1 and output to the processor P #1. Thus, the addition result XS of the data X1, X2, and X3 is distributed and shared among all the processors P #1, #2, and #3.

In the case of the ring topology, since each adjacent NIC is connected by a communication ring, two communication ports (communication channels) are provided in each NIC, and six (=2×3) communication ports are required in the entire system. As illustrated in FIG. 2, in a case where three processors are used, data makes a round of each NIC in a ring shape in each of an aggregation phase until it is determined that the aggregation calculation processing started by the head NIC #1 is completed by the head NIC #1 and a distribution phase until the distribution processing started by the head NIC #1 is completed by the head NIC #1.

Thus, assuming that the delay time per communication port is L, in a case where the data makes one round of each NIC in a ring shape, the data is delayed by time 6L in each of the aggregation phase and the distribution phase. Therefore, assuming that the number of processors is n (n is an integer of 2 or more), a delay of time 2nL occurs.

Here, focusing on the start of distribution of the addition result XS, in the example of FIG. 2, among the processors P #1, #2, and #3 involved in the aggregation calculation processing of the addition result XS, only transmission and reception of the addition result XS are performed between the NIC #3 located at the tail position and the head NIC #1 located at the head position in the first pipeline connection PL1, and data transfer not directly related to the aggregation calculation processing and the distribution processing occurs.

In embodiments of the present invention, focusing on such useless data transfer of the addition result XS, when the addition result XS is obtained by the tail NIC #3, the addition result XS is not transferred to the head NIC #1, and the distribution processing of the addition result XS is immediately started. Thus, it is possible to omit data transfer between the tail NIC #3 and the head NIC #1, and consequently, it is possible to reduce delay time caused by passage through the communication port in each of the aggregation phase and the distribution phase.

Accordingly, in a case where three processors are used as illustrated in FIG. 2, it is only required to pass through 4 (=2×(3−1)) communication ports in each of the aggregation phase and the distribution phase. Thus, assuming that the delay time per communication port is L, the delay time is delayed by time 4L in each of the aggregation phase and the distribution phase. Therefore, assuming that the number of processors is n, the delay time can be reduced to time 2(n−1)L.

[Distributed Processing System]

Next, a configuration of the distributed processing system 10 according to the present embodiment will be described in detail with reference to FIG. 1.

As illustrated in FIG. 1, the distributed processing system 10 includes a plurality of processors P that performs calculation processing, and a plurality of communication interface NICs (Network Interface Cards) that is provided corresponding to the respective processors P and configures the first pipeline connection PL1 by connecting the processors in series via a first communication line L1. The processor P and the communication interface NIC paired with each other may be regarded as an integrated device and called a node.

[Processor]

The processor P is a general calculation processing device used to process distributed deep learning. The above-described data storage technology such as GPUDirect RDMA or RoCE (RDMA over Converged Ethernet) is applied to a configuration using a graphics processing unit (GPU) as the processor P. The processor P holds data obtained by performing calculation processing of data stored in advance by the communication interface NIC by each processor P before starting the aggregation calculation processing and the distribution processing. These pieces of data are data (element data) belonging to a series of array data including a one-dimensional array, and are held in a distributed manner in each processor P.

[Communication Interface]

The communication interface NIC (#1, #2, and #3) includes two communication ports (communication channels) PTA and PTB and a control circuit CNT as a main circuit configuration.

[Communication Port]

The communication ports PTA and PTB are configured to transmit and receive data and an aggregation result to and from the adjacent communication interface NIC via the first communication line L1.

[Control Circuit]

The control circuit CNT (#1, #2, and #3) is configured to perform an aggregation calculation of data output from each processor P in a normal order including a head communication interface located at the head position of the first pipeline connection PL1, an intermediate communication interface located at the intermediate position, and a tail communication interface located at the tail position, during the aggregation calculation processing.

Further, the control circuit CNT is configured to start distribution of the obtained aggregation result, distribute the aggregation result in the reverse order of the tail communication interface, the intermediate communication interface, and the head communication interface, and output the aggregation result to the own processor when the aggregation calculation in the tail communication interface is completed during the distribution processing.

The control circuit CNT has different processing contents depending on where the own communication interface NIC is located in the first pipeline connection PL1. Note that, hereinafter, on the basis of the normal order of the first pipeline connection PL1 (the processing order of the aggregation calculation processing), the communication interface NIC adjacent to the head side of any communication interface NIC is referred to as a pre-stage communication interface NIC, and the communication interface NIC adjacent to the tail side of any communication interface NIC is referred to as a next-stage communication interface NIC.

When the own communication interface NIC is the head communication interface, the control circuit CNT transmits data output from the own processor P to the next-stage communication interface NIC.

Further, in a case where the own communication interface NIC is the intermediate communication interface, the control circuit CNT performs the aggregation calculation of the data received from the pre-stage communication interface NIC and the data output from the own processor P, and transmits an obtained intermediate result to the next-stage communication interface NIC.

Further, in a case where the own communication interface NIC is the tail communication interface, the control circuit CNT performs the aggregation calculation of the data (intermediate result) received from the pre-stage communication interface NIC and the data output from the own processor P, and starts the distribution processing of an obtained aggregation result in response to completion of the aggregation calculation.

Where each communication interface NIC is located in the first pipeline connection PL1 may be set in a hardware manner in each control circuit CNT when the distributed processing system 10 is constructed, or may be set in a software manner in each control circuit CNT when data is stored in each processor P.

[Operation of First Embodiment]

Next, operations of the distributed processing system 10 and a distributed processing method according to the present embodiment will be described with reference to FIGS. 1 and 3. Here, a case where addition processing is performed as the aggregation calculation will be described. Note that it is assumed that three of X1, X2, and X3 are held in a distributed manner in each of the processors P1, P2, and P3 as one-dimensional array data to be subjected to the aggregation calculation. Further, it is assumed that the communication interfaces NIC #1, NIC #2, and NIC #3 are head, intermediate, and tail communication interfaces NIC, respectively. Hereinafter, the communication interface NIC is simply referred to as an NIC.

In the present embodiment, as illustrated in FIG. 1, while a case where the number n of the processors P and the communication interfaces NIC is n=3 will be described as an example, the present embodiment is not limited thereto, and even if n=2 or n≥4, the present embodiment can be applied similarly to bellow. In particular, when n=2, it is a configuration in which the intermediate communication interface NIC is omitted. Further, when n≥4, it is a configuration in which n−2 intermediate communication interfaces NIC are connected.

[Aggregation Phase] (First Step S1-1)

First, in the aggregation phase, the head NIC #1 transmits the data X1 output from the own processor P #1 from the communication port PTB to the intermediate NIC #2 of the next stage. The intermediate NIC #2 adds the data X1 from the head NIC #1 received through the communication port PTA and the data X2 output from the own processor P #2, and transmits the obtained intermediate result (=X1+X2) from the communication port PTB to the tail NIC #3 of the next stage. The tail NIC #3 adds the intermediate result from the head NIC #1 received through the communication port PTA and the data X3 output from the own processor P #3 to generate an addition result XS (=X1+X2+X3) of the entire first pipeline connection PL1.

[Distribution Phase] (Second Step S1-2)

Next, when the addition result XS is generated at the tail NIC #3, the aggregation phase is completed and the distribution phase is started. First, the tail NIC #3 transmits the addition result XS generated by itself from the communication port PTA to the intermediate NIC #2 of the pre-stage, and outputs the addition result XS to the own processor P3. The intermediate NIC #2 transmits the addition result XS from the tail NIC #3 received in the communication port PTB from the communication port PTA to the head NIC #1 of the pre-stage, and outputs the addition result XS to the own processor P2. The head NIC #1 outputs the addition result XS from the intermediate NIC #2 received through the communication port PTB to the own processor P1. Thus, the addition result XS obtained by the aggregation calculation processing is distributed and shared among the processors P1, P2, and P3.

According to the present embodiment, as compared with the conventional configuration illustrated in FIG. 2, in each of the aggregation phase and the distribution phase, it is not via the port PTB of the tail NIC #3 and the port PTA of the head NIC #1, and the number of communication ports through which data to be transferred passes can be reduced. Accordingly, assuming that the number of processors is n (n is an integer of 2 or more), the number of communication ports of the entire distributed processing system 10 is 2(n−1), and thus, assuming that the delay time per communication port is L, the generated delay is time 2(n−1)L. Therefore, the delay time is reduced by time 2L as compared with delay time 2n in the conventional configuration.

[Effects of First Embodiment]

As described above, according to the present embodiment, as compared with the conventional configuration illustrated in FIG. 2, the number of communication ports through which data to be transferred passes can be reduced in each of the aggregation phase and the distribution phase, and consequently, it is possible to reduce the delay time. Therefore, it is possible to further improve delay performance of Allreduce in an interconnect of heterogeneous computing. Further, since the number of ports to be used is reduced, it is possible to reduce each of power consumption, procurement cost, and malfunction handling.

[Second Embodiment]

Figure 4:
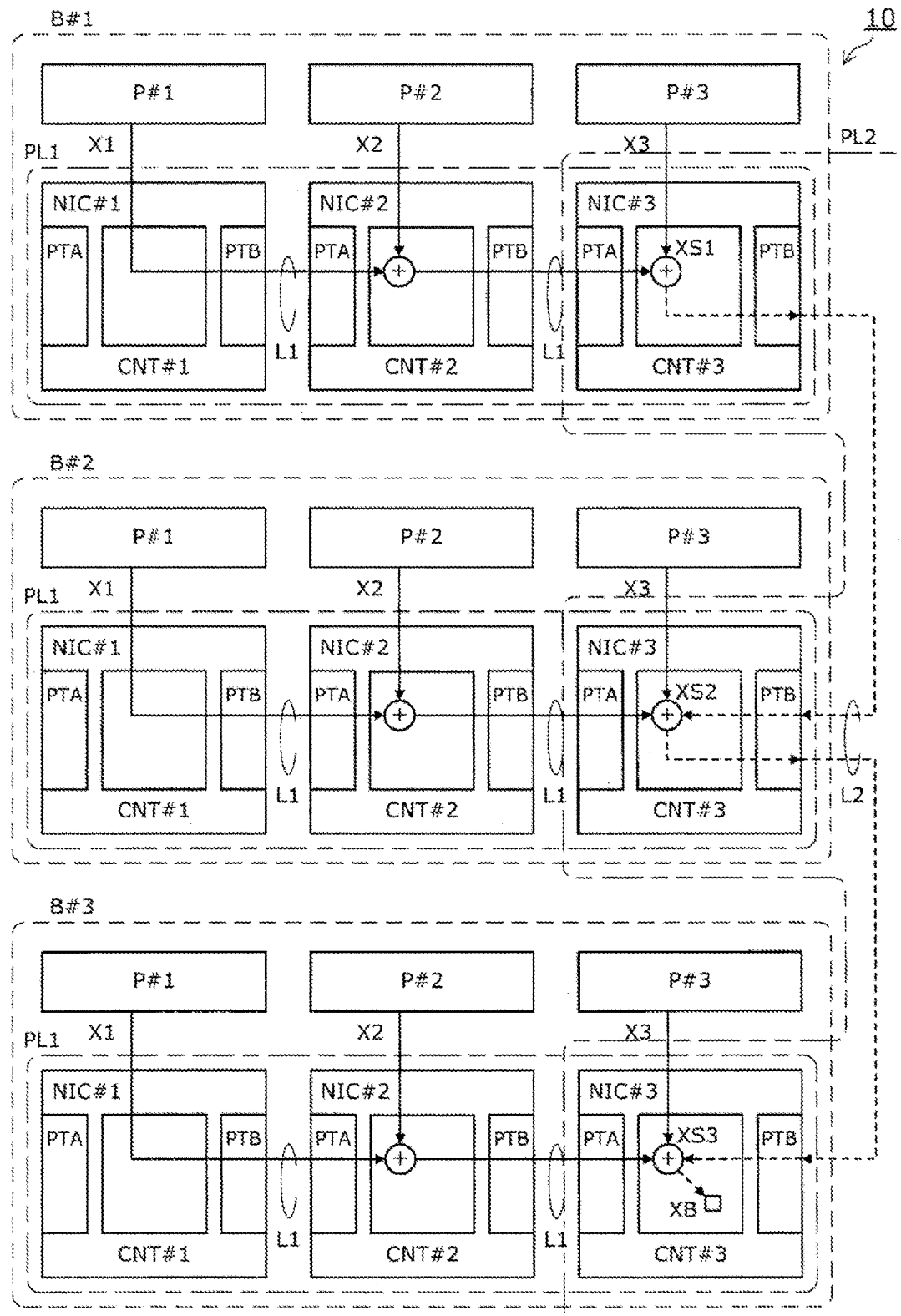
FIG. 4 is a block diagram illustrating a configuration and an operation of a distributed processing system according to a second embodiment.
Figure 5:
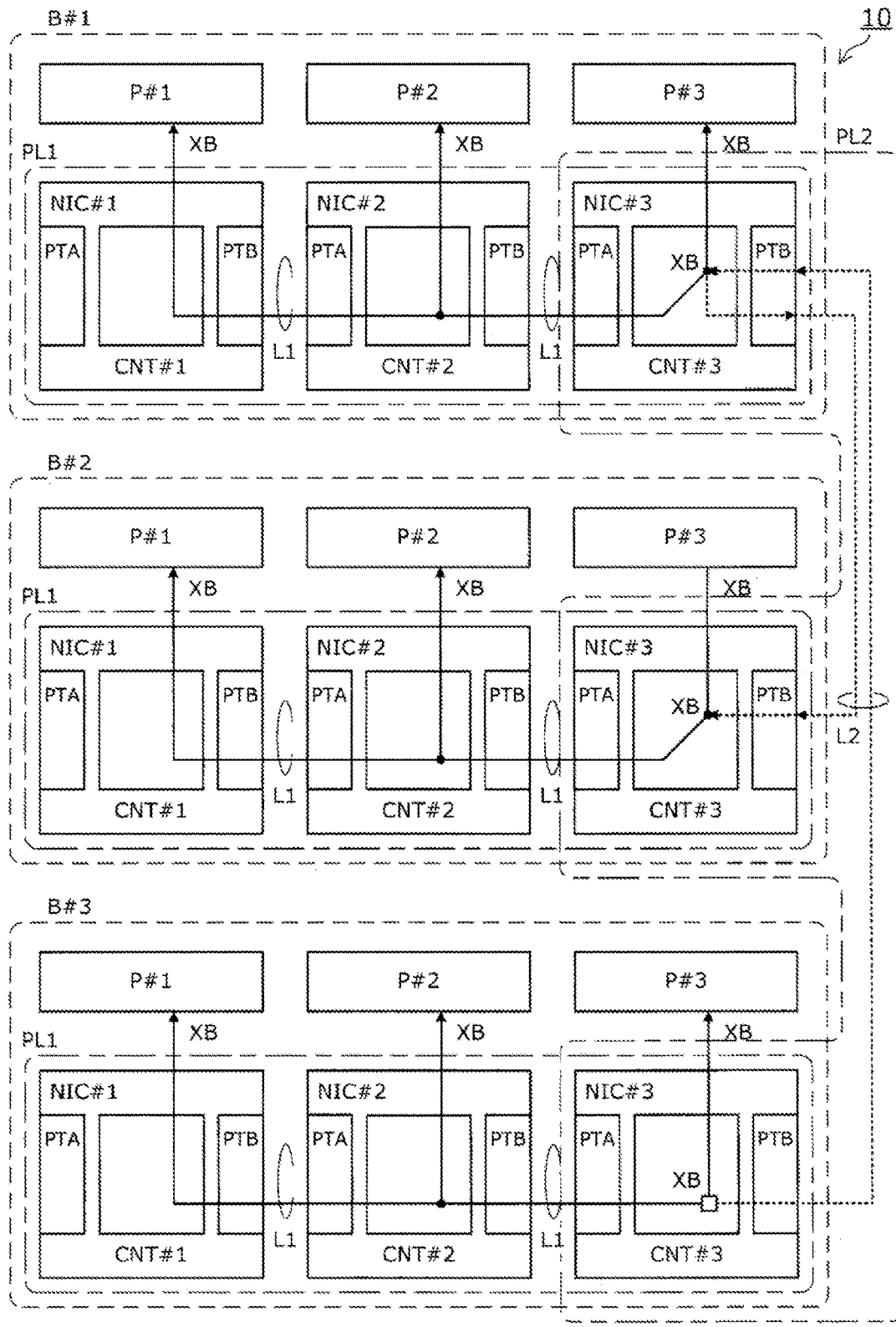
FIG. 5 is a block diagram illustrating a configuration and an operation (continuation) of the distributed processing system according to the second embodiment.

Next, a distributed processing system 10 according to a second embodiment of the present invention will be described with reference to FIGS. 4 and 5. FIG. 4 is a block diagram illustrating a configuration and an operation of the distributed processing system according to the second embodiment. FIG. 5 is a block diagram illustrating a configuration and an operation (continuation) of the distributed processing system according to the second embodiment.

As illustrated in FIGS. 4 and 5, the distributed processing system 10 according to the present embodiment includes m (m is an integer of 2 or more) blocks B each including n (n is an integer of 2 or more) processors P and communication interfaces NIC.

In the present embodiment, as illustrated in FIGS. 4 and 5, a case where n=3 and m=3 will be described as an example, but the present embodiment is not limited thereto, and the present embodiment can be applied similarly to below even if n=2 or n≥4 or even if m=2 or m≥4. In particular, in a case where n=2, it is a configuration in which the intermediate NIC is omitted, and in a case where n≥4, it is a configuration in which n−2 intermediate NICs are connected. Further, in a case where m=2, it is a configuration in which the intermediate block m is omitted, and in a case where m≥4, it is a configuration in which m−2 intermediate blocks m are connected.

When a plurality of pieces of array data obtained by dividing array data (first array data) to be subjected to the aggregation processing is aggregated in each block, and the obtained aggregation result is further aggregated among blocks, an aggregation result of the entire array data can be obtained.

In the present embodiment, a second pipeline connection PL2 is configured by connecting the blocks by the tail NIC #3 of each of the blocks B #1, #2, and #3 via the second communication line L2, the aggregation result obtained in each of the blocks B #1, #2, and #3 is further subjected to the aggregation calculation by the second pipeline connection PL2, and an obtained inter-block aggregation result is distributed to each other by the second pipeline connection PL2.

Further, in a case where the inter-block aggregation result is obtained by the second pipeline connection PL2, the NIC #1, #2, or #3 of each of the blocks B #1, #2, or #3 is configured to start distribution of the inter-block aggregation result in the first pipeline PL1, distribute the inter-block aggregation result in the order of the tail NIC #3, the intermediate NIC #2, or the head NIC #1, and output the inter-block aggregation result to the own processors P #1, P #2, or P #3 in the blocks B #1, #2, or #3.

[Operation of Second Embodiment]

Figure 6:
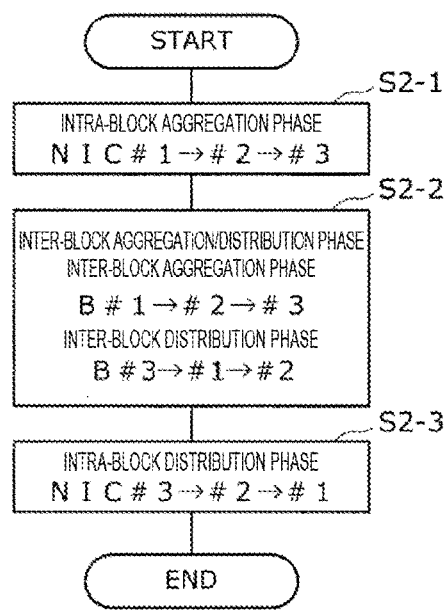
FIG. 6 is a flowchart illustrating an operation of a distributed processing method according to the second embodiment.

Next, operations of the distributed processing system 10 and the distributed processing method according to the present embodiment will be described with reference to FIGS. 4, 5, and 6. Here, a case where the addition processing is performed as the aggregation calculation will be described. Note that, in the respective processors P1, P2, and P3 of the blocks B #1, B #2, and B #3, the array data obtained by dividing the original array data into three (m=3) is assumed to be held in a distributed manner in three (n=3) pieces of the data X1, X2, and X3 to be subjected to the aggregation calculation.

[Intra-Block Aggregation Phase] (First Step S2-1)

In an intra-block aggregation phase, aggregation calculation processing of aggregating the data X1, X2, and X3 held by the processors P1, P2, and P3 in the block i (i=1, 2, and 3) is executed for each of the blocks B #1, #2, and #3. At this time, the intra-block aggregation phase is executed in parallel in the first pipeline connection PL1 in each of the blocks B #1, #2, and #3.

As illustrated in FIG. 4, first, in each block B #i, the NIC #1 located at the head position in the first pipeline connection PL1 transmits the data X1 output from the own processor P #1 from the communication port PTB to the NIC #2 of the next stage. The NIC #2 adds the data X1 from the NIC #1 received through the communication port PTA and the data X2 output from the own processor P #2, and transmits an obtained intermediate result (=X1+X2) from the communication port PTB to the NIC #3 of the next stage. The NIC #3 located at the tail position in the first pipeline connection PL1 adds the intermediate result XP2 from the NIC #2 received through the communication port PTA and the data X3 output from the own processor P #3 to generate an addition result XSi (=X1+X2+X3) of the entire block B #i. Thus, the intra-block aggregation phase is completed.

[Inter-Block Aggregation/Distribution Phase] (Second Step S2-2)

After the intra-block aggregation phase is completed, an inter-block aggregation phase of aggregating the addition results XSi generated in the respective blocks B #1, #2, and #3 is executed. At this time, the inter-block aggregation phase is executed in the second pipeline connection PL2 including the tail NIC #3 of each of the blocks B #1, #2, and #3, similarly to the intra-block aggregation phase.

As illustrated in FIG. 4, first, the NIC #3 of the block B #1 located at the head position in the second pipeline connection PL2 transmits an addition result XS1 of the block B #1 generated by itself from the communication port PTB to the NIC #3 of the block B #2 of the next stage. The NIC #3 of the block B #2 adds the addition result XS1 of the block B #1 from the NIC #3 of the block B #1 received through the communication port PTB and the addition result XS2 of the block B #2 generated by itself, and transmits the obtained intermediate result (=XS1+XS2) from the communication port PTB to the NIC #3 of the block B #3 of the next stage. The NIC #3 of the block B #3 located at the tail position in the second pipeline connection PL2 adds the intermediate result from the NIC #3 of the block B #2 received through the communication port PTB and the addition result XS3 of the block B #1 generated by itself, and generates a block addition result XB (=XS1+XS2+XS3) of all the respective blocks B #1, #2, and #3. Thus, the inter-block aggregation phase is completed.

After the inter-block aggregation phase is completed, an inter-block distribution phase of distributing the block addition result XB of all the respective blocks B #1, #2, and #3 to the blocks B #1, #2, and #3 is executed. At this time, the inter-block distribution phase is executed in the second pipeline connection PL2 in the order of the blocks B #3, #1, and #2.

As illustrated in FIG. 5, first, the NIC #3 of the block B #3 located at the tail position in the second pipeline connection PL2 transmits the block addition result XB generated by itself from the communication port PTB to the NIC #3 of the block B #1 of the pre-stage. The NIC #3 of the block B #1 transmits the block addition result XB from the NIC #3 of the block B #3 received at the communication port PTB from the communication port PTB to the NIC #3 of the block B #2 of the pre-stage. The NIC #3 of the block B #2 receives the block addition result XB from the NIC #3 of the block B #1 at the communication port PTB. Thus, the inter-block distribution phase is completed.

[Intra-Block Distribution Phase] (Third Step S2-3)

After the inter-block distribution phase is completed, an inter-block distribution phase of distributing the block addition result XB in each of the blocks B #1, #2, and #3 is executed. At this time, the intra-block distribution phase is executed in parallel in the first pipeline connection PL1 of each of the blocks B #1, #2, and #3 in the reverse order opposite to the normal order of the intra-block aggregation phase.

As illustrated in FIG. 5, first, in each block B #i, the NIC #3 located at the tail position in the first pipeline connection PL1 transmits the block addition result XB distributed in the second pipeline connection PL2 from the communication port PTA to the NIC #2 of the pre-stage and outputs the block addition result XB to the own processor P #3. The NIC #2 transmits the block addition result XB from the NIC #3 received through the communication port PTB from the communication port PTA to the NIC #1 of the pre-stage and outputs the block addition result XB to the own processor P #2. The NIC #1 located at the head position in the first pipeline connection PL1 outputs the block addition result XB from the NIC #2 received through the communication port PTB to the own processor P #1. Thus, the intra-block distribution phase is completed.

In general, assuming that the number of processors is n×m, the number of communication ports of the entire distributed processing system 10 is 2 nm, and thus, assuming that the delay time per communication port is L, a delay of 2 nm occurs. According to the present embodiment, since the number of communication ports of the entire distributed processing system 10 is 2(n−1)(m−1), assuming that the delay time per communication port is L, the generated delay is time 2(n−1+m−1)L. Therefore, the delay time is reduced by time 2(nm−n−m+2)L as compared with the delay time 2 nm in the conventional configuration, and the delay time is reduced by time 2(nm−n−m+1)L as compared with the first embodiment.

[Effects of Second Embodiment]

As described above, according to the present embodiment, even when the array data to be subjected to the aggregation processing is two-dimensional array data, the number of communication ports through which the transferred data passes can be reduced in each of the aggregation phase and the distribution phase as compared with the conventional configuration illustrated in FIG. 2, and consequently, it is possible to reduce the delay time. Therefore, it is possible to further improve the delay performance of Allreduce in an interconnect of heterogeneous computing. Further, since the number of ports to be used is reduced, it is possible to reduce each of power consumption, procurement cost, and malfunction handling.

[Third Embodiment]

Figure 7:
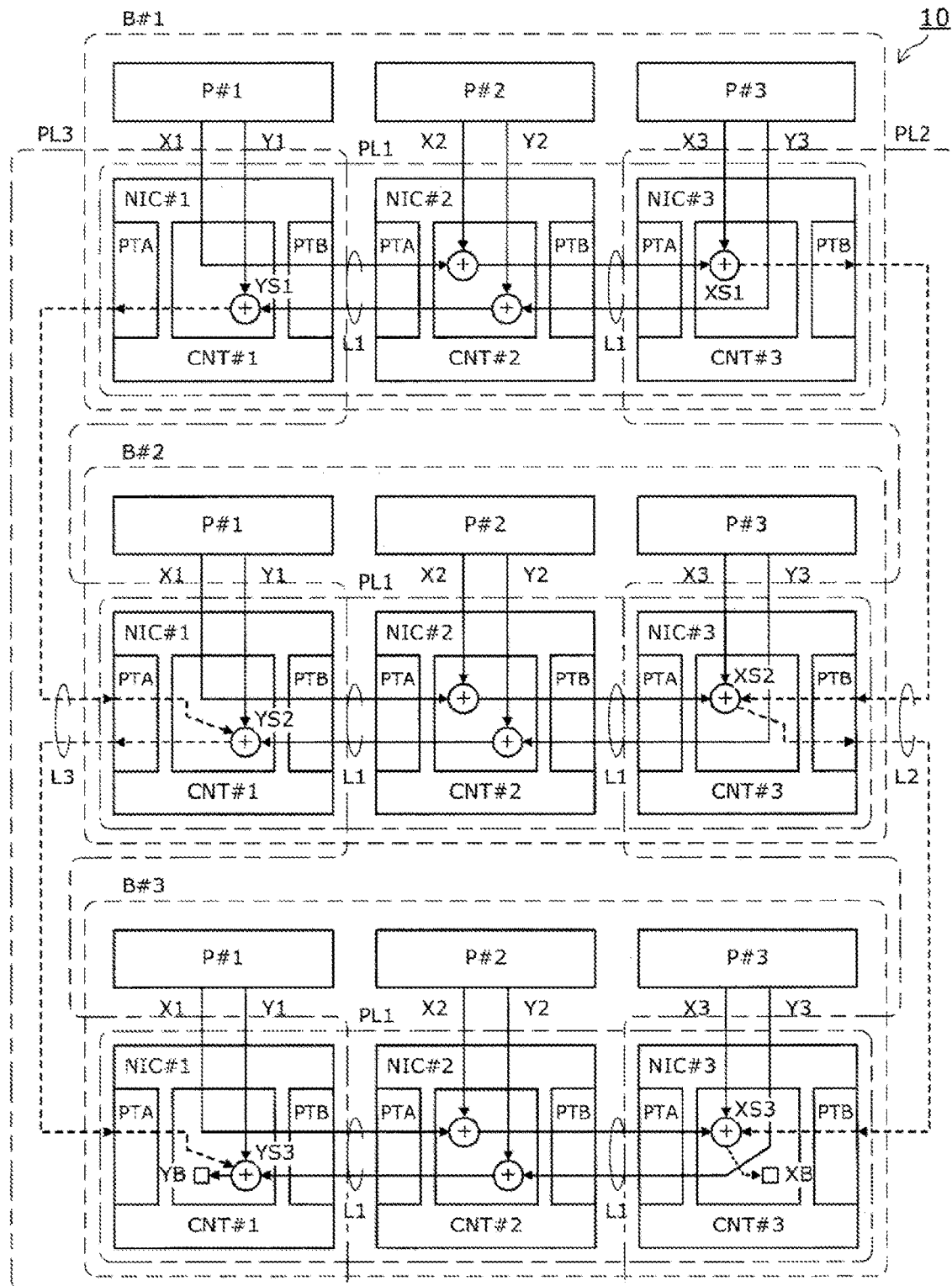
FIG. 7 is a block diagram illustrating a configuration and an operation of a distributed processing system according to a third embodiment.
Figure 8:
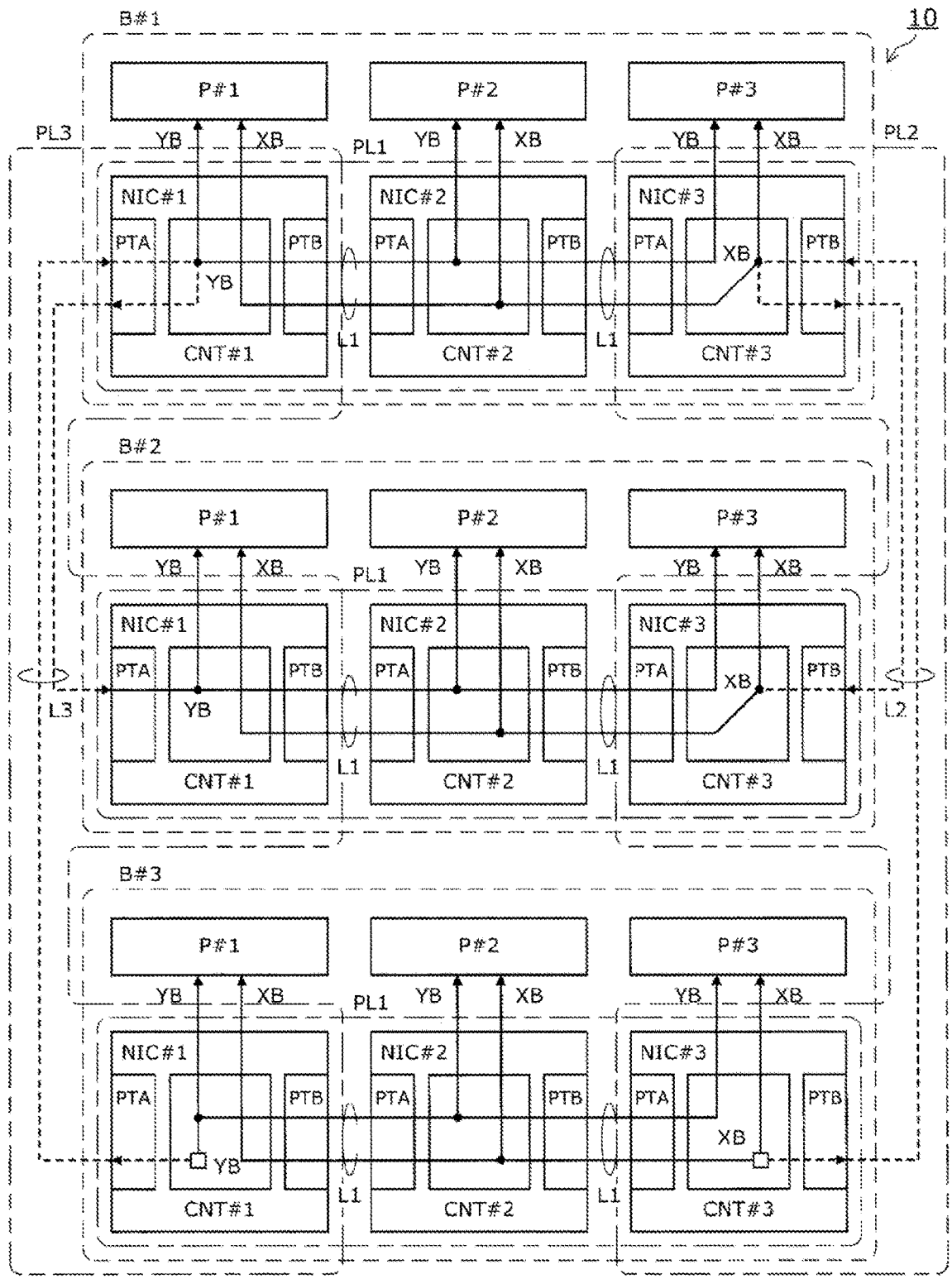
FIG. 8 is a block diagram illustrating a configuration and an operation (continuation) of the distributed processing system according to the third embodiment.

Next, a distributed processing system 10 according to a third embodiment of the present invention will be described with reference to FIGS. 7 and 8. FIG. 7 is a block diagram illustrating a configuration and an operation of the distributed processing system according to the third embodiment. FIG. 8 is a block diagram illustrating a configuration and an operation (continuation) of the distributed processing system according to the third embodiment.

In FIGS. 7 and 8 described above, the case has been described where the aggregation calculation processing and the distribution processing among the blocks are executed using the second pipeline connection PL2 in a case where the array data to be subjected to the aggregation processing is divided into a plurality of blocks has been described as an example. In the present embodiment, a case will be described where the aggregation calculation processing and the distribution processing among the plurality of blocks are executed using a third pipeline connection PL3 configured by connecting the blocks via a third communication line L3 by the head NIC #1 of each of the blocks B #1, #2, and #3 in addition to the second pipeline connection PL2 in a case where the array data to be subjected to the aggregation processing is two-dimensional array data (first array data and second array data).

As illustrated in FIGS. 7 and 8, similarly to FIGS. 4 and 5 described above, the distributed processing system 10 according to the present embodiment includes m (m is an integer of 2 or more) blocks B each including n (n is an integer of 2 or more) processors P and communication interfaces NIC.

In the present embodiment, as illustrated in FIGS. 7 and 8, a case where n=3 and m=3 will be described as an example, but the present embodiment is not limited thereto, and the present embodiment can be applied similarly to below even if n=2 or n≥4 or even if m=2 or m≥4.

Figure 3:
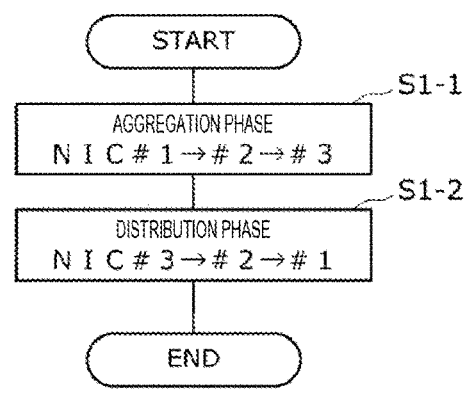
FIG. 3 is a flowchart illustrating an operation of a distributed processing method according to the first embodiment.

In the intra-block aggregation phase and the intra-block distribution phase, as illustrated in FIGS. 3 and 4, the communication line L1 is used for data communication in only one direction, and data communication in the other direction is in an empty state. In the present embodiment, the aggregation calculation processing and the distribution processing are executed in parallel in the normal order and the reverse order of the first pipeline connection PL1 for data of two different one-dimensional arrays in each of the blocks B #1, #2, and #3 using the communication line L1 in the empty state.

Further, a third pipeline connection PL3 is provided in addition to the second pipeline connection PL2, and two aggregation results obtained by aggregating data of two different one-dimensional arrays in each of the blocks B #1, #2, and #3 are subjected to the aggregation calculation processing and the distribution processing among the blocks by the two pipeline connections PL2 and PL3.

[Operation of Third Embodiment]

Figure 9:
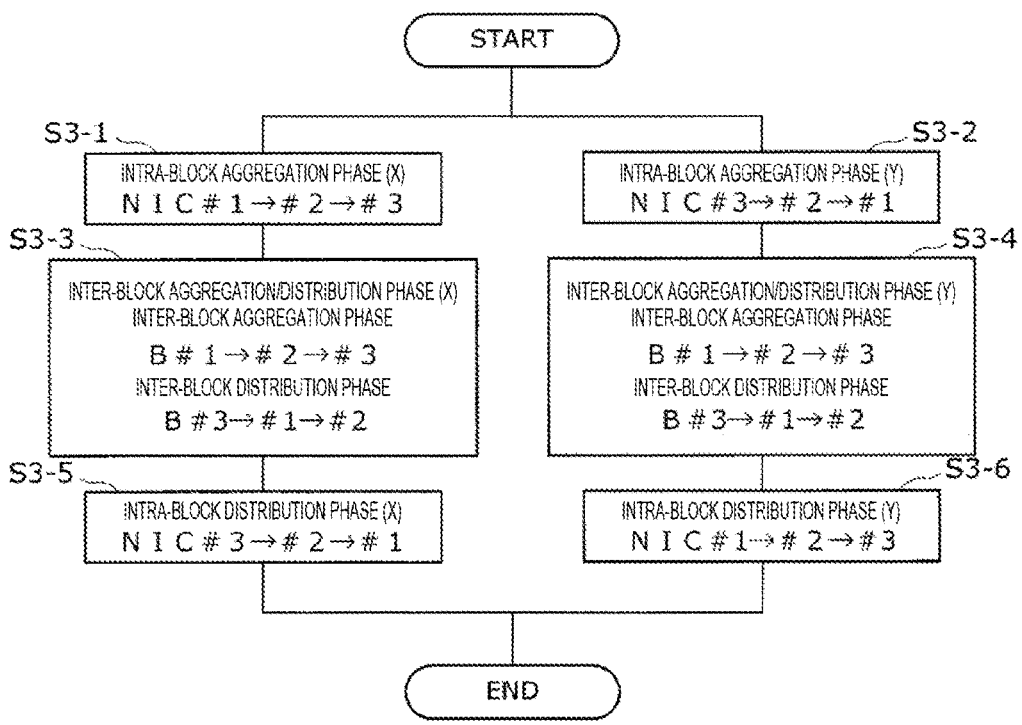
FIG. 9 is a flowchart illustrating an operation of a distributed processing method according to the third embodiment.

Next, operations of the distributed processing system 10 and the distributed processing method according to the present embodiment will be described with reference to FIGS. 7, 8, and 9. Here, a case where the addition processing is performed as the aggregation calculation will be described. Note that it is assumed that data X1, X2, and X3 (first array data) of the first one-dimensional array and data Y1, Y2, and Y3 (second array data) of the second one-dimensional array are held in a distributed manner in the processors P1, P2, and P3 of the blocks B #1, B #2, and B #3, respectively.

[Intra-Block Aggregation Phase] (First Step S3-1 and Second Step S3-2)

In the intra-block aggregation phase, for each of the blocks B #1, #2, and #3, the aggregation calculation processing of aggregating the data X1, X2, and X3 held by the processors P1, P2, and P3 in the block B #i (i=1, 2, and 3) and the aggregation calculation processing of aggregating the data Y1, Y2, and Y3 are executed in parallel in the normal order and the reverse order using the first pipeline connection PL1. At this time, the intra-block aggregation phase is executed in parallel in the first pipeline connection PL1 in each of the blocks B #1, #2, and #3. Thus, in each of the blocks B #1, #2, and #3, an addition result XSi (=X1+X2+X3) (first aggregation result) is generated in the NIC #3 located at the tail position in the first pipeline connection PL1, and an addition result YSi (=Y1+Y2+Y3) (second aggregation result) is generated in the NIC #1 located at the head position in the first pipeline connection PL1. Note that details of the intra-block aggregation phase are similar to those in FIG. 3 described above, and detailed description thereof is omitted here.

[Inter-Block Aggregation/Distribution Phase] (Third Step S3-3 and Fourth Step S3-4)

After the intra-block aggregation phase is completed, the inter-block aggregation phase of aggregating the addition result XSi and the addition result YSi generated in each of the blocks B #1, #2, and #3 is executed. At this time, in the inter-block aggregation phase, the addition result XSi is subjected to the aggregation calculation in the second pipeline connection PL2 including the tail NIC #3 of each of the blocks B #1, #2, and #3, and a block addition result XB (=XS1+XS2+XS3) (the aggregation result among the first blocks) of all the respective blocks B #1, #2, and #3 is generated in the NIC #3 of the block B #3 located at the tail position in the second pipeline connection PL2.

Further, the addition result YSi is subjected to the aggregation calculation in the third pipeline connection PL3 including the head NIC #1 of each of the blocks B #1, #2, and #3, and a block addition result YB (=YS1+YS2+YS3) (the aggregation result among the second blocks) of all the respective blocks B #1, #2, and #3 is generated in the NIC #1 of the block B #3 located at the tail position in the third pipeline connection PL3. Note that details of the inter-block aggregation phase are similar to those in FIG. 3 described above, and detailed description thereof is omitted here.

After the inter-block aggregation phase is completed, the inter-block distribution phase of distributing the block addition results XB and YB of all the respective blocks B #1, #2, and #3 to the blocks B #1, #2, and #3 is executed in parallel in the second pipeline connection PL2 and the third pipeline connection PL3. At this time, the block addition result XB is executed by the second pipeline connection PL2 in the order of the blocks B #3, #1, and #2, and the block addition result YB is executed by the third pipeline connection PL3 in the order of the blocks B #3, #1, and #2. Note that details of the inter-block distribution phase are similar to those in FIG. 4 described above, and detailed description thereof will be omitted here.

[Intra-Block Distribution Phase] (Fifth Step S3-5 and Sixth Step S3-6)

After the inter-block distribution phase is completed, the inter-block distribution phase of distributing the block addition results XB and YB in each of the blocks B #1, #2, and #3 is executed in parallel in the first pipeline connection PL1. At this time, the block addition result XB is executed by the first pipeline connection PL1 in the reverse order opposite to the normal order of the intra-block aggregation phase. Further, the block addition result YB is executed by the first pipeline connection PL1 in the normal order opposite to the reverse order of the intra-block aggregation phase. Note that details of the intra-block distribution phase are similar to those in FIG. 4 described above, and detailed description thereof will be omitted here.

[Effects of Third Embodiment]

As described above, according to the present embodiment, in a case where the array data to be subjected to the aggregation processing is data of a two-dimensional array, the aggregation calculation processing and the distribution processing can be executed in parallel for data of two different one-dimensional arrays. Thus, the delay time caused by the communication port can be reduced to the same extent as the configurations of FIGS. 3 and 4, and a double data amount can be processed. Therefore, it is possible to obtain high data processing performance while improving the delay performance of Allreduce in the interconnect of the heterogeneous computing. Further, since the number of ports to be used is reduced, it is possible to reduce each of power consumption, procurement cost, and malfunction handling.

[Extension of Embodiments]

Although the present invention has been described with reference to the embodiments, the present invention is not limited to the above embodiments. Various changes that can be understood by those skilled in the art can be made in the configuration and details of the present invention within the scope of the present invention. Further, each embodiment can be implemented in any combination within a range not contradictory.

REFERENCE SIGNS LIST

10 Distributed processing system
P, P #1, P #2, P #3 Processor
NIC, NIC #1, NIC #2, NIC #3 Communication interface
CNT, CNT #1, CNT #2, CNT #3 Control circuit
PTA, PTB Communication port
PL1 First pipeline connection
PL2 Second pipeline connection
PL3 Third pipeline connection
B, B #1, B #2, B #3 Block
L1 First communication line
L2 Second communication line
L3 Third communication line
X1, X2, X3, Y1, Y2, Y3 Data
XS, XSi, XS1, XS2, XS3, YS, YSi, YS1, YS2, YS3 Addition result
XB, YB Block addition result

The invention claimed is:

1. A distributed processing system comprising:
a plurality of processors configured to perform calculation processing; and
a plurality of communication interfaces respectively corresponding to the plurality of processors and configured to:
configure a first pipeline connection by connecting the plurality of processors via a first communication line;
perform aggregation calculation processing of array data held in a distributed manner by the plurality of processors on a basis of a Ring-Allreduce algorithm; and
distribute an obtained aggregation result to each of the plurality of processors,
wherein each of the plurality of communication interfaces is configured to perform an aggregation calculation of data belonging to the array data output from the each processor in a first order including a head communication interface located at a head position of the first pipeline connection, an intermediate communication interface located at an intermediate position of the first pipeline connection, and a tail communication interface located at a tail position of the first pipeline connection, and
wherein each of the plurality of communication interfaces is configured to start distribution of an obtained aggregation result in a case where the aggregation calculation in the tail communication interface is completed, distribute the aggregation result in a second order including the tail communication interface, the intermediate communication interface, and the head communication interface, and output the aggregation result to the processor of the communication interface.

2. A distributed processing system comprising
a plurality of processors configured to perform calculation processing; and
a plurality of communication interfaces provided respectively corresponding to the plurality of processors and configured to:
configure a first pipeline connection by connecting the plurality of processors via a first communication line;
perform aggregation calculation processing of first array data held in a distributed manner by the plurality of processors on a basis of a Ring-Allreduce algorithm; and
distribute an obtained aggregation result to each of the processors,
wherein the distributed processing system comprises a plurality of blocks including the plurality of processors and the plurality of communication interfaces,
wherein the communication interface belonging to each of the plurality of blocks is configured to generate an aggregation result by performing an aggregation calculation of data belonging to the first array data output from the each processor in a first order including a head communication interface located at a head position of the first pipeline connection, an intermediate communication interface located at an intermediate position of the first pipeline connection, and a tail communication interface located at a tail position of the first pipeline connection,
wherein the tail communication interface belonging to each of the plurality of blocks is configured to configure a second pipeline connection by connecting the plurality of blocks via a second communication line, perform an aggregation calculation of the aggregation result obtained in each of the plurality of blocks by the second pipeline connection, and distribute an obtained aggregation result among the plurality of blocks by the second pipeline connection, and
wherein when the aggregation result among the plurality of blocks is obtained by the second pipeline connection, the communication interface belonging to each of the plurality of blocks is configured to start distribution of the aggregation result among the plurality of blocks, distribute the aggregation result among the plurality of blocks in a second order including the tail communication interface, the intermediate communication interface, and the head communication interface, and output the aggregation result among the plurality of blocks to the processor of the communication interface.

3. A distributed processing system comprising:
a plurality of processors configured to perform calculation processing; and
a plurality of communication interfaces provided respectively corresponding to the plurality of processors and configured to:
configure a first pipeline connection by connecting the plurality of processors via a first communication line;

perform aggregation calculation processing of first array data and second array data held in a distributed manner by the plurality of processors on a basis of a Ring-Allreduce algorithm; and distribute an obtained aggregation result to each of the plurality of processors, wherein the distributed processing system comprises a plurality of blocks including the plurality of processors and the plurality of communication interfaces, wherein the communication interface belonging to each of the plurality of blocks is configured to generate a first aggregation result by performing an aggregation calculation of data belonging to the first array data output from the each processor in a first order including a head communication interface located at a head position of the first pipeline connection, an intermediate communication interface located at an intermediate position of the first pipeline connection, and a tail communication interface located at a tail position of the first pipeline connection, wherein the communication interface belonging to each of the plurality of blocks generates a second aggregation result by performing an aggregation calculation of data belonging to the second array data output from the each processor in a second order including the tail communication interface, the intermediate communication interface, and the head communication interface, wherein the tail communication interface belonging to each of the plurality of blocks is configured to configure a second pipeline connection by connecting the plurality of blocks via a second communication line, perform an aggregation calculation of the first aggregation result obtained in each of the plurality of blocks by the second pipeline connection, and distribute an obtained aggregation result among first blocks by the second pipeline connection, wherein the head communication interface belonging to each of the plurality of blocks is configured to configure a third pipeline connection by connecting the plurality of blocks via a third communication line, perform an aggregation calculation of the second aggregation result obtained in each of the plurality of blocks by the third pipeline connection, and distribute an obtained aggregation result among second blocks by the third pipeline connection, and wherein the communication interface belonging to each of the plurality of blocks is configured to distribute the aggregation result among the first blocks obtained by the second pipeline connection in the second order of the tail communication interface, the intermediate communication interface, and the head communication interface, distribute the aggregation result among the second blocks obtained by the third pipeline connection in the first order of the head communication interface, the intermediate communication interface, and the tail communication interface, and output the aggregation results among the first and second blocks to the processor of the communication interface.

* * * * *